United States Patent
Chou et al.

(10) Patent No.: US 6,893,047 B2
(45) Date of Patent: May 17, 2005

(54) CANISTER MOUNTING STRUCTURE

(75) Inventors: Tsuyoshi Chou, Wako (JP); Shoichiro Kumagai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/666,161

(22) Filed: Sep. 18, 2003

(65) Prior Publication Data

US 2004/0075269 A1 Apr. 22, 2004

(30) Foreign Application Priority Data

Oct. 22, 2002 (JP) .................................... 2002-307375

(51) Int. Cl.[7] .................................................. B60P 3/22
(52) U.S. Cl. ..................................... 280/834; 180/69.4
(58) Field of Search ................................ 280/830, 781, 280/797, 799, 800, 834; 180/69.4; 123/519

(56) References Cited

U.S. PATENT DOCUMENTS

| 4,787,643 A | * 11/1988 | Shirata ....................... 280/834 |
| 4,805,581 A | 2/1989 | Yamada et al. |
| 5,702,125 A | * 12/1997 | Nakajima et al. ........... 280/834 |
| 5,868,428 A | 2/1999 | Ishikawa |

FOREIGN PATENT DOCUMENTS

JP        3241552        6/1996

* cited by examiner

Primary Examiner—Daniel G. DePumpo
(74) Attorney, Agent, or Firm—Merchant & Gould P.C.

(57) ABSTRACT

A mounting structure for a canister for collecting fuel vapors generated in a fuel tank is provided. The canister is disposed within the space between a front end and a rear end of a subframe for supporting rear suspensions. The subframe is mounted to a rear portion of the vehicle frame.

2 Claims, 6 Drawing Sheets ically extending left and right rear side frames 102, 102, a crossmember 103 extended therebetween, and a subframe 104 arranged below the crossmember 103 and extended between the left and right rear side frames 102, 102. The subframe 104 supports rear suspensions, not shown.

CANISTER MOUNTING STRUCTURE

FIELD OF THE INVENTION

The present invention relates to a structure for mounting to a vehicle frame a canister for collecting fuel vapors generated in a fuel tank.

BACKGROUND OF THE INVENTION

Automobiles with internal combustion engines to burn fuel such as gasoline, for example, employ a fuel vapor recovery system for collecting fuel vapors generated in fuel tanks. The recovery system includes a canister. The canister temporarily stores fuel vapors generated in a fuel tank. When an engine is started, the fuel vapors are drawn from the canister into the induction system of the engine.

The canister is generally preferably mounted near the fuel tank so as to shorten piping from the fuel tank to the canister. In view of arrangement space in the vehicle, it is especially preferable to arrange the fuel tank in a vehicle rear portion and arrange the canister behind the tank. A mounting structure for this kind of canister is disclosed, for example, in Japanese Patent No. 3241552.

The canister mounting structure disclosed in Japanese Patent No. 3,241,552 will be described below with reference to FIGS. 6 and 7.

Referring to FIGS. 6 and 7, a vehicle 100 includes, at the rear of a vehicle frame 101, longitudinally extending left and right rear side frames 102, 102, a crossmember 103 extended therebetween, and a subframe 104 arranged below the crossmember 103 and extended between the left and right rear side frames 102, 102. The subframe 104 supports rear suspensions, not shown.

A fuel tank 111 is arranged forward of the crossmember 103. A canister 112 is mounted to the undersurface of the crossmember 103. The canister 112 is disposed between the above-located crossmember 103 and the below-located subframe 104.

The canister 112 protrudes rearward from the crossmember 103 and the subframe 104. If an obstacle collides with the rear of the vehicle 100 (hereinafter referred to as "at a rear-end collision"), the vehicle rear 105 plastically deforms in a forward direction as shown by imaginary lines in FIG. 6, abutting on the canister 112.

The canister 112 has a simple configuration filled with an absorbent such as activated carbon for absorbing fuel vapors and is basically harmless even when damaged by impact energy.

However, if some amount of liquid fuel enters the canister 112 from the fuel tank 111 by a certain cause, it is preferable that there be no leakage of liquid fuel from the canister 112 at a rear-end collision. It is thus desired to improve canister protecting performance to avoid leakage of liquid fuel from canisters.

SUMMARY OF THE INVENTION

According to the present invention, there is provided a canister mounting structure which comprises: a vehicle frame; a subframe mounted to a rear portion of the vehicle frame for supporting rear suspensions; and a canister having an absorbent for absorbing fuel gases generated by evaporation in a fuel tank; the canister being disposed within a space between a front end and a rear end of the subframe.

Since the canister is disposed within the space between the front end and rear end of the subframe mounted to the rear portion of the vehicle frame, the canister can be easily and securely protected by the subframe of great rigidity when the vehicle is collided from behind (at a rear-end collision). Canister protecting performance can thus be further improved to more securely avoid the leakage of liquid fuel from the canister. The subframe for supporting the rear suspensions also serves as a canister protecting member, thus eliminating the need for an additional protecting member. The canister protecting structure can thus have a simplified configuration with a smaller number of components.

Preferably, the vehicle frame includes longitudinally extending left and right rear side frames, at least one crossmember extended between the rear side frames, and a floor panel provided over the left and right rear side frames and the crossmember, and the canister is preferably arranged forward or rearward of the crossmember, arranged above the subframe, arranged at a height to practically contact an undersurface of the floor panel, and arranged higher than the fuel tank. Thus, the entrance of liquid fuel from the fuel tank at a lower level to the canister at a higher level can be more securely avoided and the leakage of liquid fuel from the canister can be further securely avoided. Furthermore, with no entrance of liquid fuel into the canister, the performance of an absorbent such as activated carbon filling the canister can be maintained in good conditions over a long period of time.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
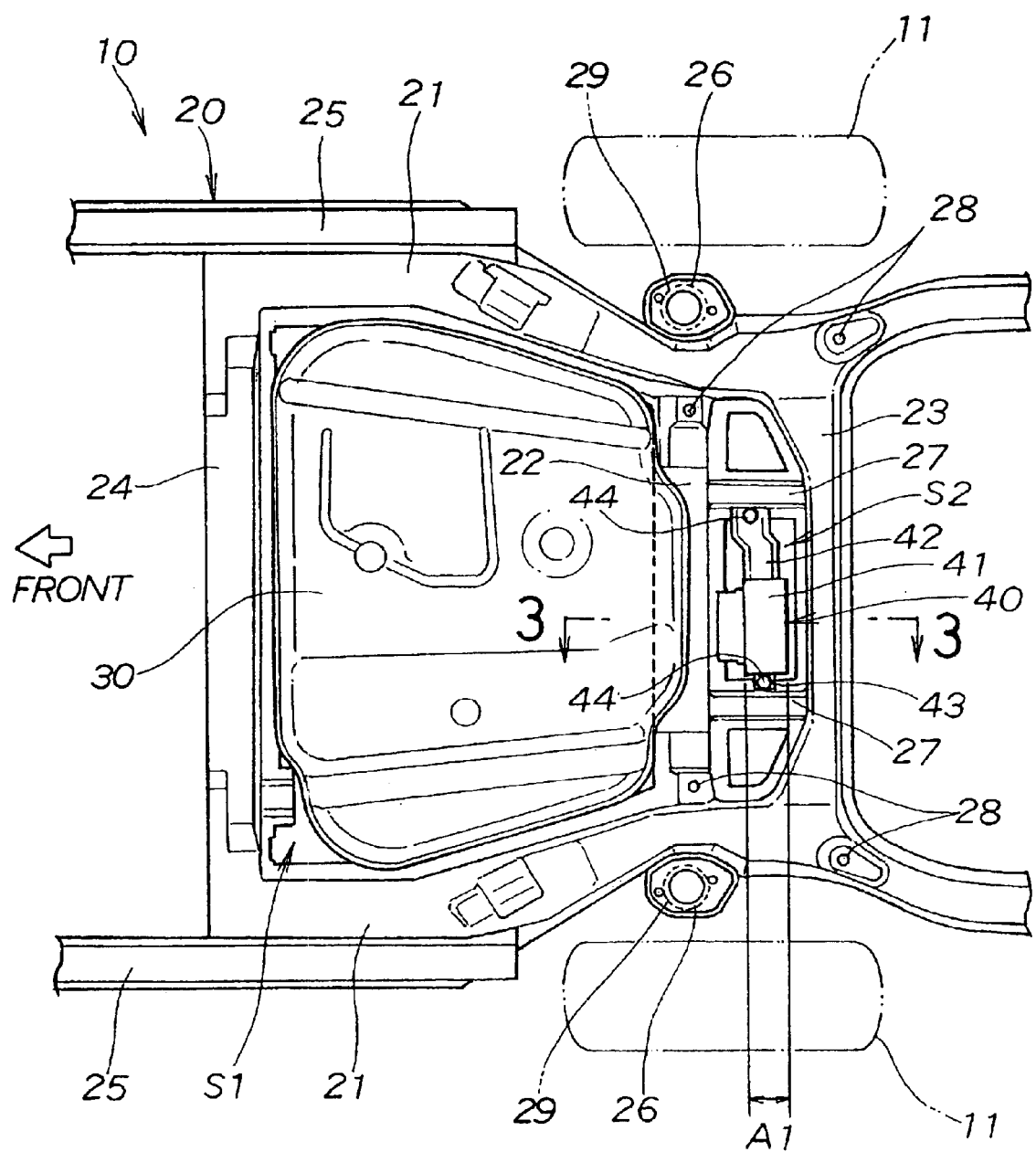
FIG. 1 is a bottom view of a vehicle rear portion with a canister mounting structure according to the present invention.

A vehicle frame 20 of a vehicle 10 shown in FIG. 1 includes vehicle longitudinally extending left and right rear side frames 21, 21, and front and rear two crossmembers extended between the rear side frames 21, 21 (a front crossmember 22 and a rear crossmember 23).

The vehicle frame 20 also includes a foremost crossmember 24 extending between the front ends of the left and right rear side frames 21, 21. Right and left side sills 25, 25 extend forward from front end portions of the left and right rear side frames 21, 21. Damper housings 26, 26 for rear suspensions are provided at the left and right sides of the left and right rear side frames 21, 21.

A fuel tank 30 is provided in a vehicle rear portion of space S1 enclosed by the left and right rear side frames 21, 21, front crossmember 22 and foremost crossmember 24. A canister 40 is provided behind the fuel tank 30, located in a generally transversely intermediate portion of space S2 enclosed by the left and right rear side frames 21, 21, front crossmember 22 and rear crossmember 23.

The canister 40 is a component of an evaporative emission control system for preventing the emission of fuel vapors generated in the fuel tank 30, being filled with an absorbent such as activated carbon for absorbing fuel vapors.

The evaporative emission control system temporarily stores fuel vapors in the fuel tank 30 in the canister 40 and, when the engine is started, draws the fuel vapors from the canister 40 into the induction system of the engine. The arrangement of the canister 40 near the fuel tank 30 allows short piping between the fuel tank 30 and the canister 40.

The canister 40 includes legs 43, 42 extending left and right from a vehicle transversely elongated case 41.

The vehicle frame 20 includes longitudinally extending left and right stays 27, 27 extended between the front crossmember 22 and the rear crossmember 23. The legs 42, 43 are secured to the stays 27, 27 with bolts 44, 44 so that the canister 40 is removably mounted to the vehicle frame 20 from below. The width of the canister 40 or the vehicle longitudinal dimension thereof is A1. The left and right rear side frames 21, 21 and the front crossmember 22 have total four subframe mounting bolt holes 28 in their bottom surfaces. In the figure, reference numerals 11, 11 denote left and right rear wheels.

Figure 2:
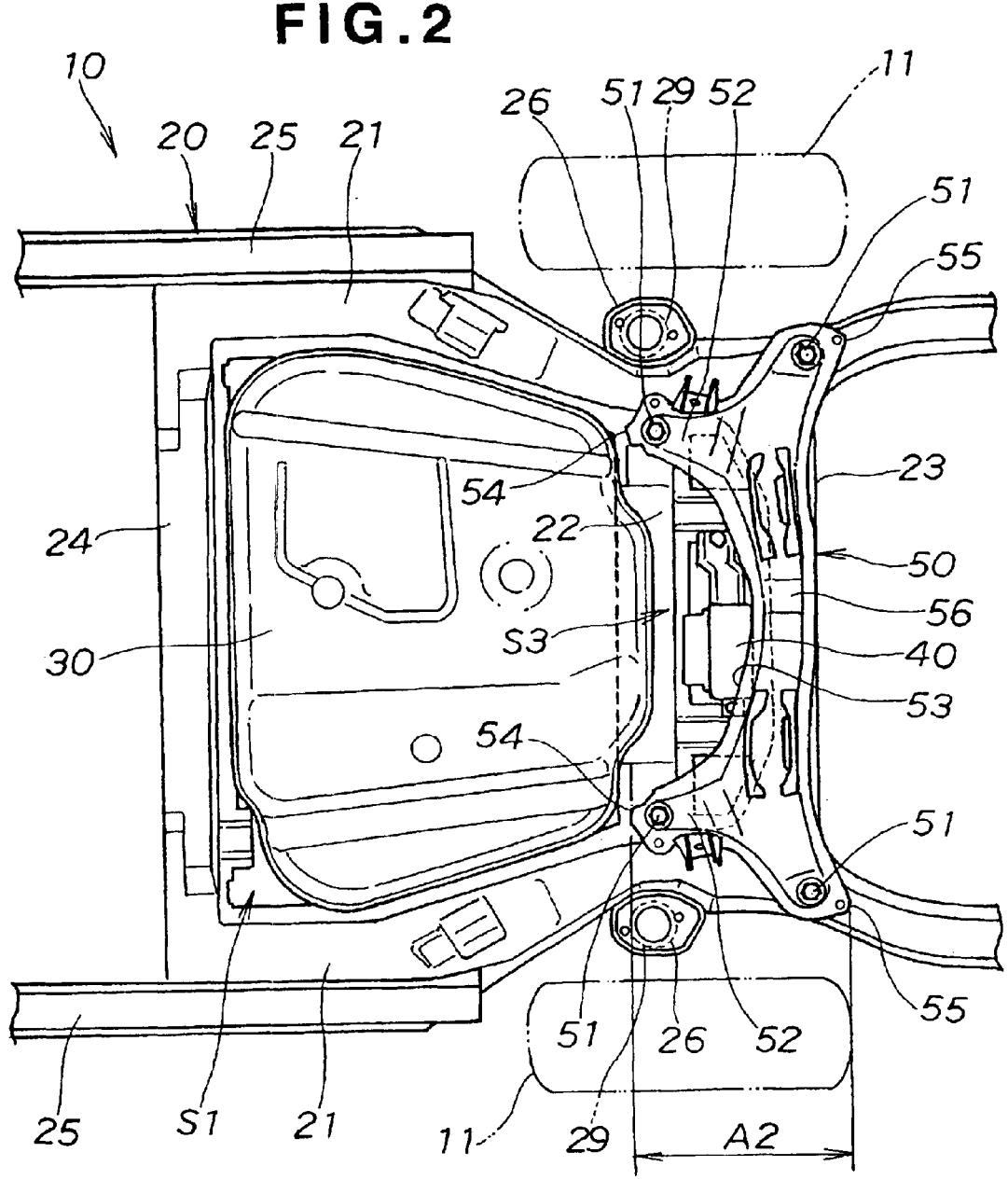
FIG. 2 is a bottom view of the vehicle rear portion with a subframe mounted to a rear portion of a vehicle frame in FIG. 1.

FIG. 2 illustrates the subframe 50 mounted to the rear portion of the vehicle frame 20 and the canister 40 arranged forward of the subframe 50.

The subframe 50 is a member of great rigidity for supporting rear suspensions 29, 29 (especially upper arms and lower arms of rear suspensions).

More specifically, the subframe 50 is shaped in a vehicle transversely elongated bar. The opposite ends of the subframe 50 are fastened to the left and right rear side frames 21, 21 with bolts 51, 51. The subframe 50 has left and right legs 52, 52 extending forward from its left and right front portions. The ends of the legs 52, 52 are secured to the front crossmember 22 with bolts 51, 51. In this manner, the subframe 50 is detachably attached to the vehicle frame 20 from below.

A front surface 53 of the subframe 50 is curved generally in an arc from a vehicle transversely central portion 56 toward front ends 54, 54 of the left and light legs 52, 52. The canister 40 is enclosed in space S3 formed by the vehicle transversely central portion 56 and the left and right legs 52, 52. That is, the subframe 50 encloses the rear, left and right of the canister 40.

A vehicle longitudinal length of the subframe 50 from the front end 54 (front end 54 of the leg 52) to a rear end 55 is A2 which is greater than the vehicle longitudinal dimension A1 of the canister 40 (see FIG. 1). The present invention is characterized in that the canister 40 is disposed within the space between the front end 54 and the rear end 55 of the subframe 50.

Figure 3:
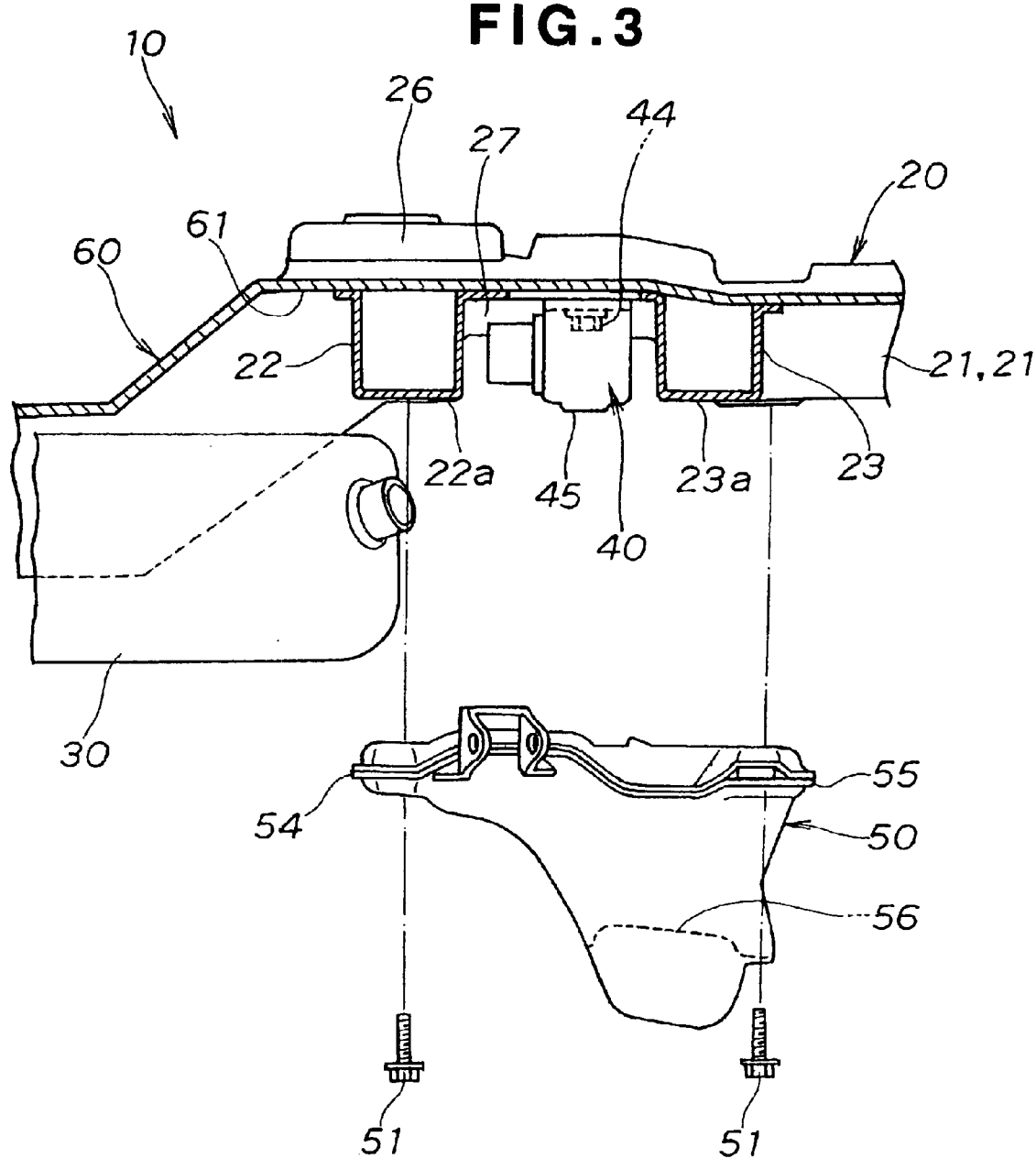
FIG. 3 is a cross-sectional view taken along line 3—3 in FIG. 1.

As shown in FIG. 3, the vehicle frame 20 includes a floor panel 60. The floor panel 60 is provided over the left and right rear side frames 21, 21 and the front and rear crossmembers 22, 23.

Rear halves of the left and right rear side frames 21, 21 between which the front and rear crossmembers 22, 23 are extended are located higher than front halves thereof at which the fuel tank 30 is disposed. Undersurfaces 22a, 23a of the front and rear crossmembers 22, 23 are located higher than the fuel tank 30.

FIG. 3 also illustrates that the canister 40 is arranged rearward of the front crossmember 22 and forward of the rear crossmember 23, and is arranged at a height to practically contact an undersurface 61 of the floor panel 60. An undersurface 45 of the canister 40 is located somewhat below the undersurfaces 22a, 23a of the front and rear crossmembers 22, 23, and is located higher than the fuel tank 30.

Figure 4:
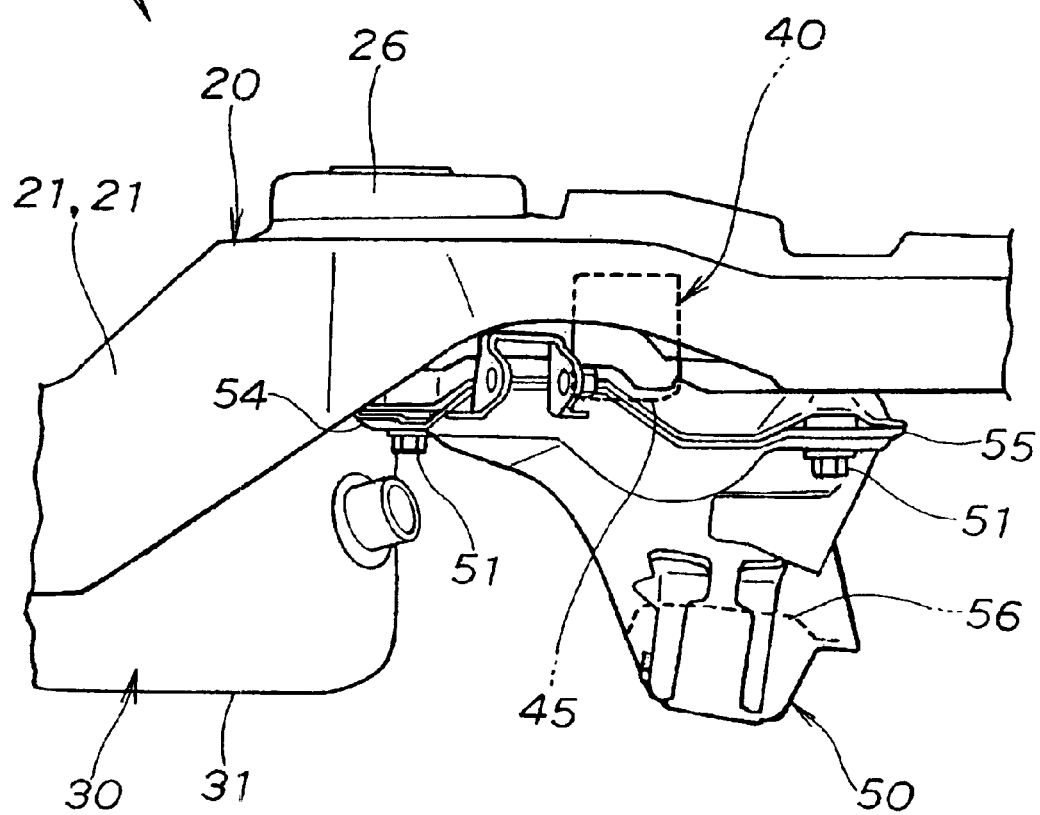
FIG. 4 is a side view of a vehicle rear portion with a fuel tank, a canister and the subframe mounted to the vehicle frame.
Figure 5:
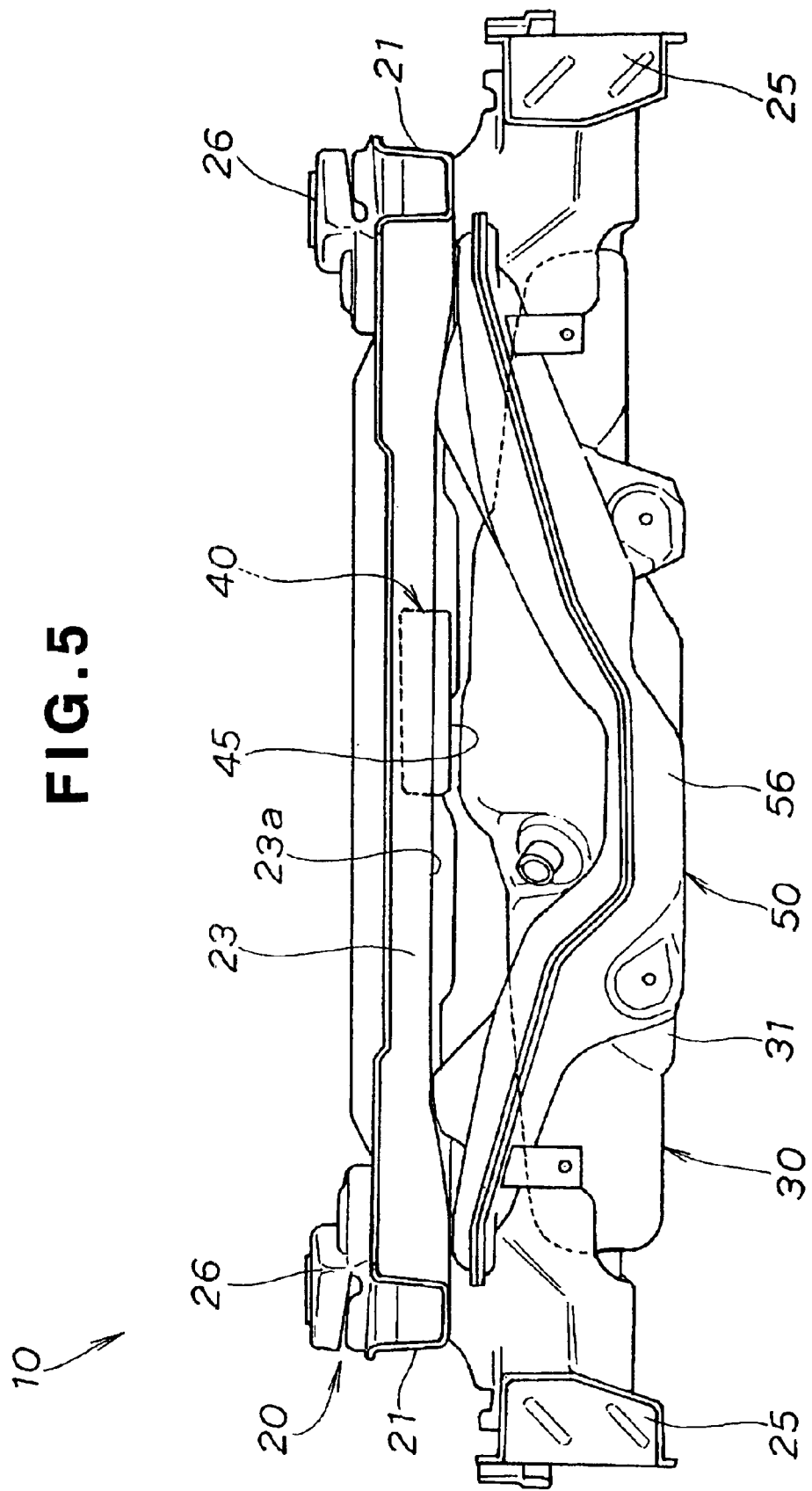
FIG. 5 is a back view of a vehicle rear portion with a vehicle transversely central portion of the subframe is lowered to the vicinity of the undersurface of the fuel tank.
Figure 6:
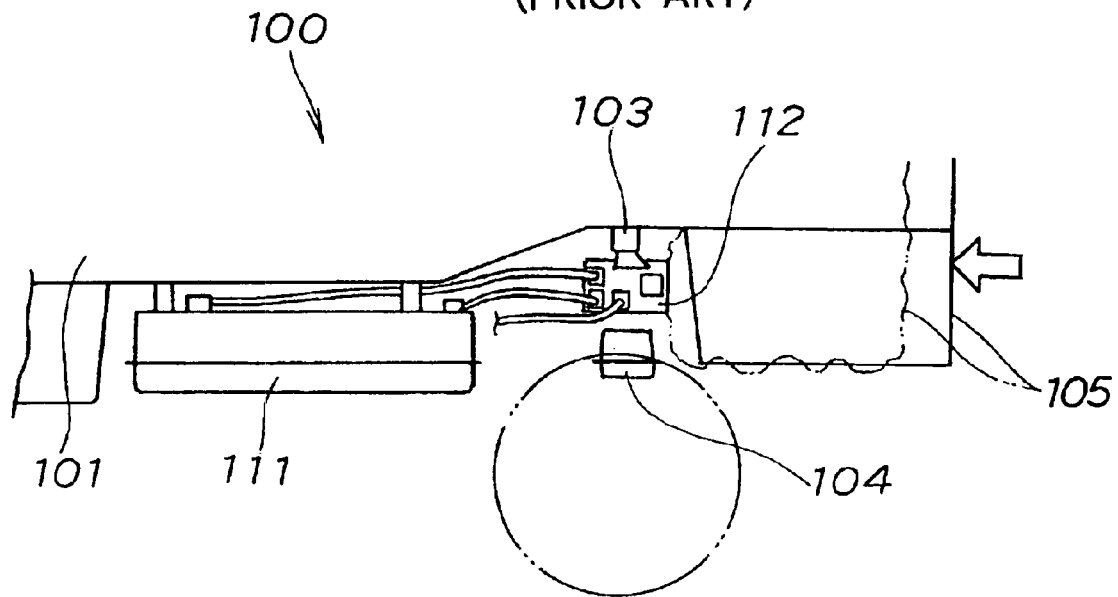
FIGS. 6 and 7 are schematic diagrams of a conventional canister mounting structure.
Figure 7:
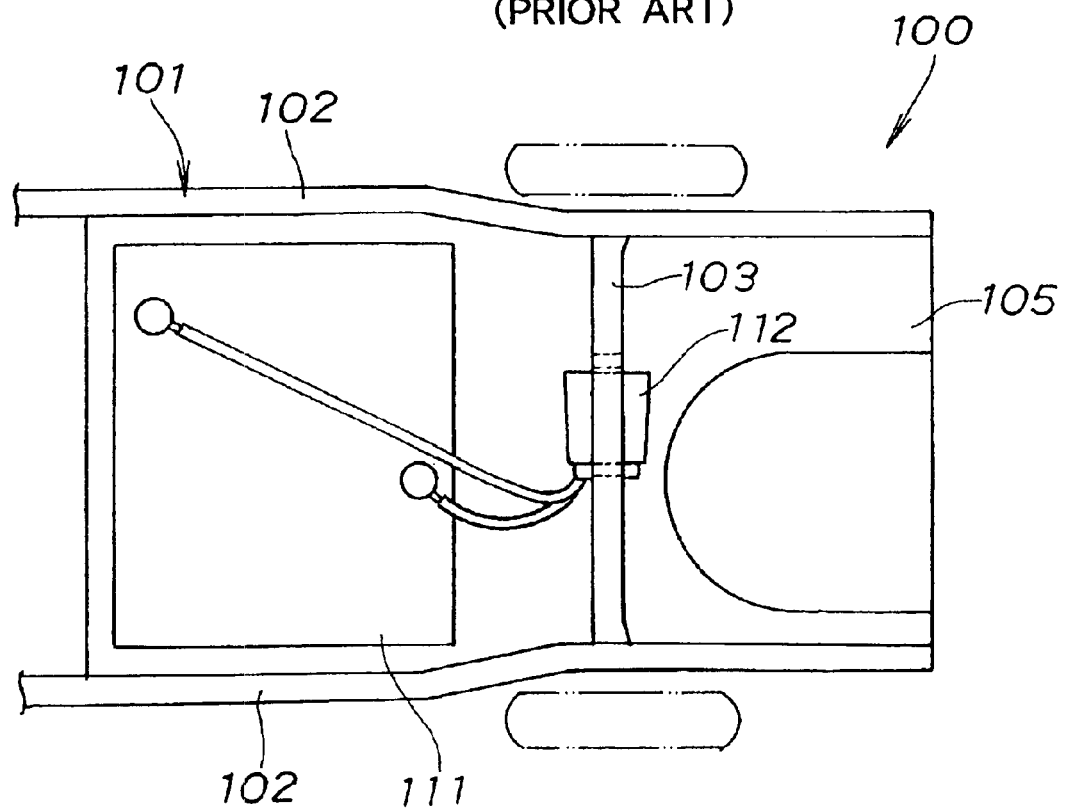

FIG. 3 illustrates the subframe 50 before mounted to the vehicle frame 20. FIGS. 4 and 5 illustrate the fuel tank 30, canister 40 and subframe 50 mounted to the vehicle frame 20. FIG. 5 illustrates that the vehicle transversely central portion 56 of the subframe 50 is lowered to the vicinity of the undersurface 31 of the fuel tank 30.

As is clear from the above description, all sides (front, rear, left and right) of the canister 40 are enclosed by the left and right rear side frames 21, 21 and the front and rear crossmembers 22, 23, and the bottom of the canister 40 is enclosed by the subframe 50, so that the protecting performance for the canister 40 is further improved.

To summarize with reference to FIGS. 3 to 5, the present invention is characterized in that the canister 40 is arranged rearward of the front crossmember 22 and forward of the rear crossmember 23, arranged above the subframe 50, and arranged at a height to practically contact the undersurface 61 of the floor panel 60. The disposition of the canister 40 avoiding the locations of the front and rear crossmembers 22, 23 allows the canister 40 to be arranged at a height to contact or almost contact the undersurface 61 of the floor panel 60. The canister 40 is disposed at a higher level by that amount.

This configuration allows the canister 40 to be arranged higher than the fuel tank 30. This ensures that the entrance of liquid fuel from the fuel tank 40 at a lower level to the canister 40 at a higher level is avoided. As a result, the leakage of liquid fuel from the canister 40 is more securely avoided. With no entrance of liquid fuel into the canister 40, the performance of an absorbent such as activated carbon filling the canister 40 is maintained in good conditions over a long period of time.

In the above embodiment, one of the front and rear crossmembers 22, 23 may be eliminated.

Obviously, various minor changes and modifications of the present invention are possible in the light of the above teaching. It is therefore to be understood that within the scope of the appended claims the invention may be practiced otherwise than as specifically described.

What is claimed is:

1. A canister mounting structure comprising:
   a vehicle frame including longitudinally extending left and right rear side frames and a plurality of crossmembers extending between the rear side frames;
   a subframe mounted to a rear portion of the vehicle frame for supporting rear suspensions; and
   a canister having an absorbent for absorbing fuel gases generated by evaporation in a fuel tank;
   the canister being disposed within a space between a front end and a rear end and between right and left ends of the subframe, the subframe extending such that it connects to the rear side frames that extend longitudinally along right and left sides of the canister and connects to one of the crossmembers, the crossmembers extending between the rear side frames along front and rear sides of the canister.

2. A canister mounting structure according to claim 1, wherein:
   the vehicle frame includes a floor panel provided over the left and right rear side frames and the crossmembers; and
   the canister is arranged between two of the crossmembers, above the subframe, higher than the fuel tank, but lower than the floor panel.

* * * * *